July 6, 1937. A. L. SODERGREEN 2,086,338
PREPARATION OF COMMINUTED ORGANIC PRODUCTS FOR PACKING
Filed May 12, 1933 3 Sheets-Sheet 3
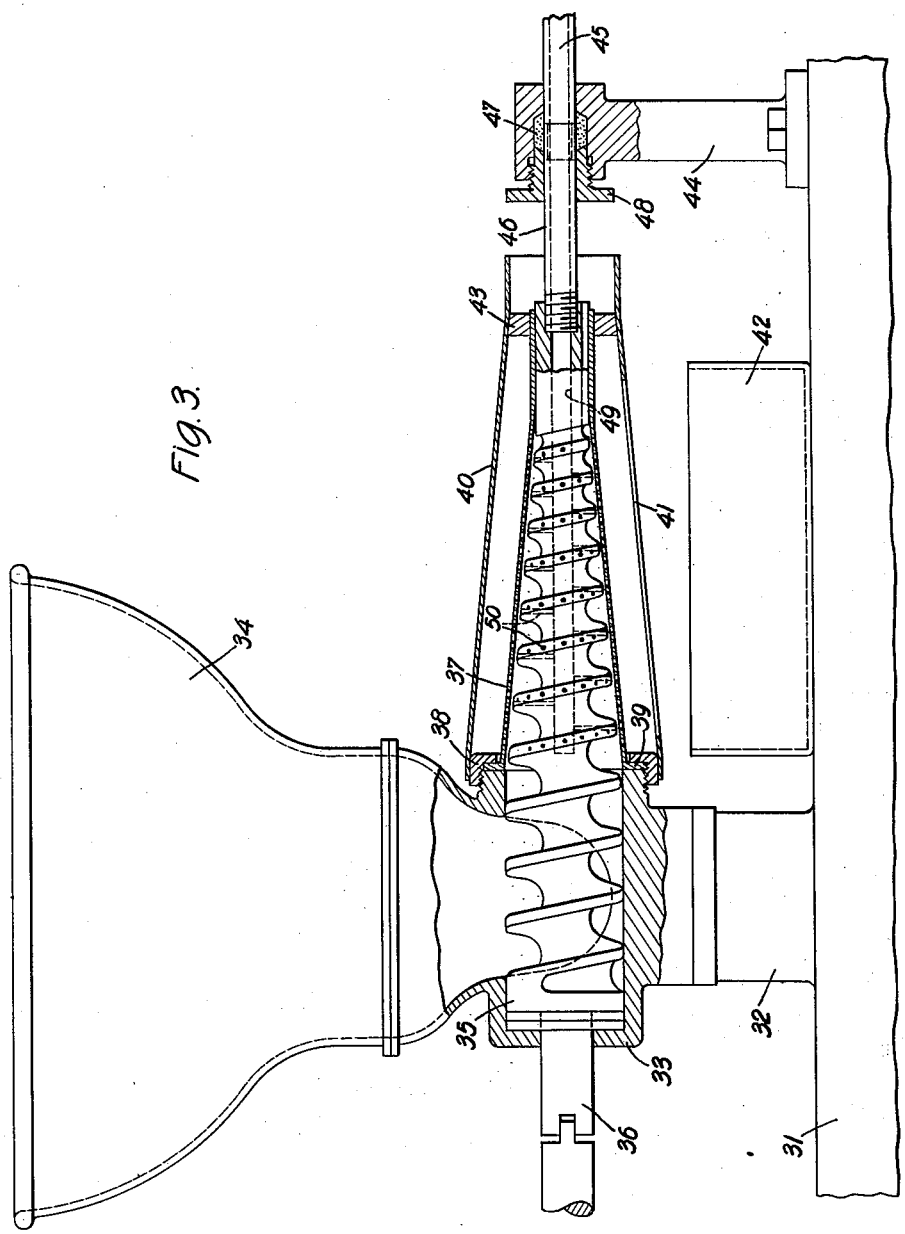
INVENTOR
Axel Leonard Sodergreen.
BY
ATTORNEYS Patented July 6, 1937

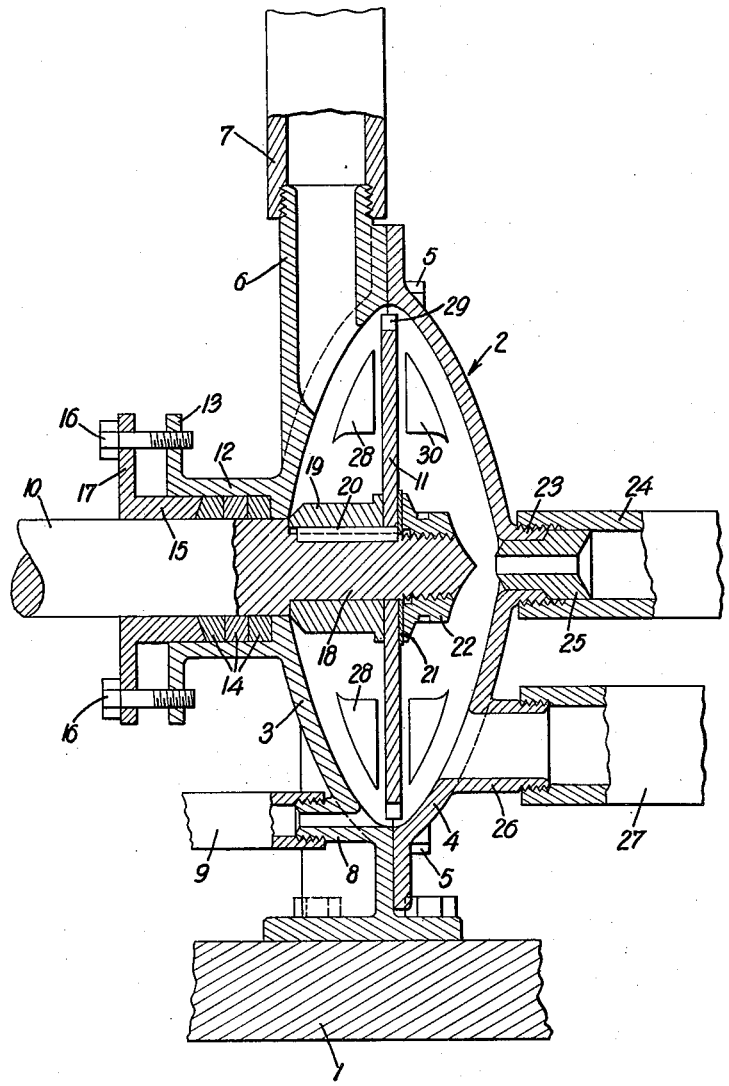

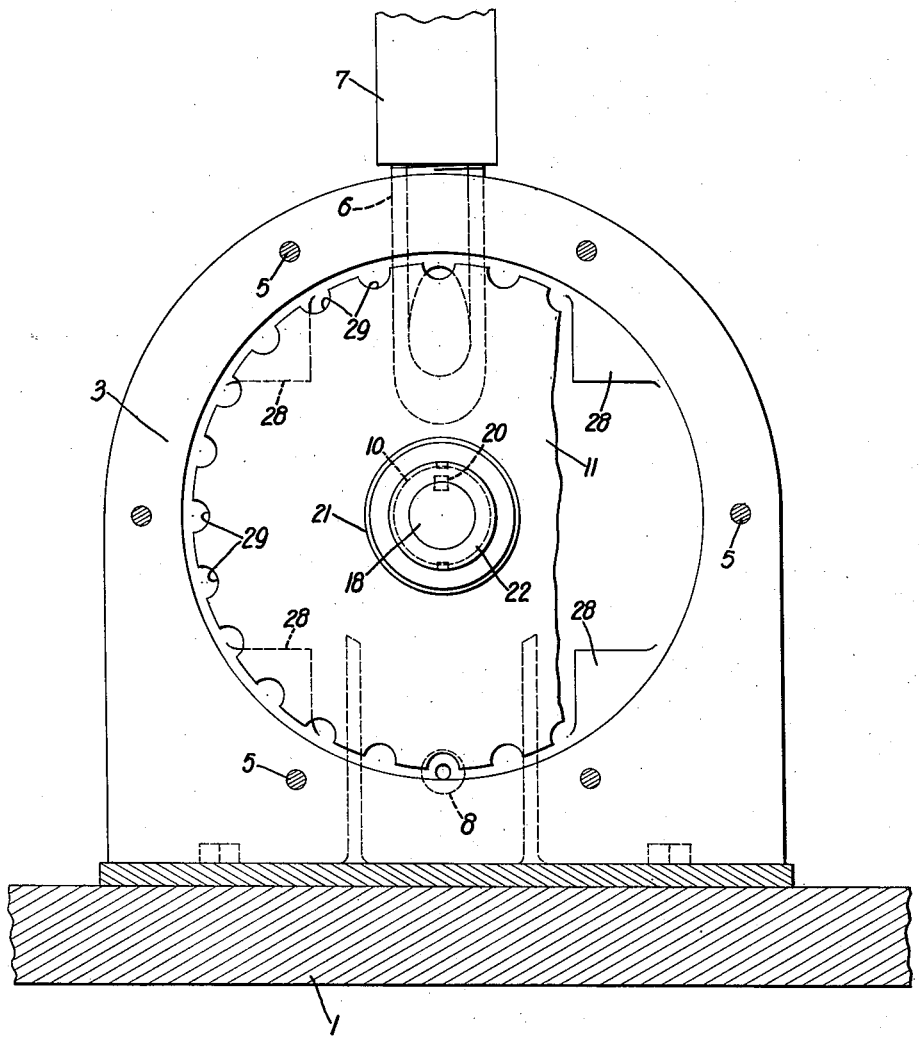

2,086,338

UNITED STATES PATENT OFFICE 2,086,338

PREPARATION OF COMMINUTED ORGANIC PRODUCTS FOR PACKING

Axel Leonard Sodergreen, Malverne, N. Y., assignor to Herbert D. Pease, New York, N. Y.

Application May 12, 1933, Serial No. 670,659

2 Claims. (Cl. 99—251)

This invention relates to the preparation of comminuted organic products, such as food products, for packing.

It is an important object of the invention to provide a method of finely sub-dividing food materials under sterile conditions and of sterilizing and/or pasteurizing the materials at a single operation.

It is a further object of the invention to provide a method whereby the contained air and oxygen is greatly reduced. To this end it is a feature that the material under treatment is subjected to pressure and agitation, that steam or other germicidal gas is injected into the material, increasing the temperature and pressure thereof, and that the pressure is thereafter reduced with the result that the air content of the material is greatly reduced. The steam serves thus both to reduce the air and oxygen content of the food material and also to destroy microscopic and larger forms of life including active oxidizing or other deteriorating enzymes or ferments normally present in natural food products.

It is a further object of the invention to provide apparatus for carrying out the above process which will be capable of operating continuously at a high rate of output. It is a feature of the invention that all portions of the apparatus which come in contact with the food are of material which is non-corroding and non-oxidizing and which does not impair the taste or flavor of the food, and that the apparatus as well as the food is subjected to the sterilizing action of steam or other biologically inactivation flow agency.

It is a further feature of the invention that the apparatus is of simple construction, is easily and quickly assembled and disassembled and is therefore easy to maintain in a sanitary condition.

The process is not, however, limited to the use of the apparatus illustratively disclosed herein but may be carried out by other means capable of accomplishing a disintegrating or comminuting effect while bringing about the destruction of bacteria or other living forces and/or enzymes.

Other objects and advantages will hereinafter appear.

In the drawings forming part of this specification,

Figure 1 is a sectional side elevation, partly broken away, illustrating the apparatus embodying the present invention;

Figure 2 is a transverse, vertical, sectional view of the apparatus of Figure 1; and Figure 3 is a sectional elevation of another form of apparatus adapted to be used in carrying out the process of the present invention.

The apparatus of Figures 1 and 2 includes a base 1 upon which a casing 2 is mounted. The casing 2 consists of complementary sections 3 and 4 which are secured to one another by machine screws 5. A nipple 6 integral with the section 3 extends upward from the casing and has threaded upon its upper end an inlet conduit 7 for delivering material from a container, not shown, to the casing. A nipple 8, integral with the casing section 3, has threaded upon it a drain conduit 9 which is normally closed but which may be opened to permit drainage when the casing is flushed out and cleaned. A shaft 10 extends through a central portion of the casing section 3 and carries a disc 11 which extends centrally across the casing chamber and which revolves at high speed to apply centrifugal force to the incoming food material and to disintegrate such material. A sleeve 12 extends rearward from the casing section 3 around the shaft opening therein and is provided at its rear end with a circumferential flange 13. Packing washers 14 are impaled upon the shaft 10 and received within the sleeve 12. A sleeve 15 surrounds the shaft 10 and forms a bearing for it. The inner end of sleeve 15 abuts against the washers 14 and holds them compressed. Bolts 16 are passed through a circumferential flange 17 of the sleeve 15 and are threaded into the flange 13 of sleeve 12. These bolts may be turned to adjust the pressure which is applied to the packing washers 14.

The end of the shaft 10 which lies within the casing 2 has a reduced portion 18 upon which a spacing sleeve 19 is fitted. The sleeve abuts at one end against the shaft shoulder formed by the reducing of the size of the shaft and at the other end against the disc 11. The sleeve 19 and the disc 11 are driven by the shaft 10 through a key 20. At the forward face of the disc provision is made of a washer 21 and a clamping nut 22, the latter being threaded upon the extremity of the shaft to clamp the disc 11 firmly in place against the spacing collar 19. The forward ends of the shaft 18 and the clamping nut 22 jointly present a surface which is of generally conical shape, the surface elements of the cone, however, being concave as illustrated in Figure 1. A nipple 23 integral with casing section 4 has threaded upon it a steam inlet pipe 24. A small bore nozzle member 25 is fitted within the nipple 23 and the adjacent end of the pipe 24 for controlling the rate of delivery of steam to the casing. The axis of the nozzle member 25 is in line with the apex of the conical surface of the members 10 and 22 so that steam injected through the nozzle impinges upon the conical surface at the apex thereof and is distributed in all directions with substantial velocity, the steam being driven into the body of the food materials and condensed.

The casing section 4 is provided near the bottom thereof with an integral nipple 26. A discharge conduit 27 is threaded onto the nipple 26.

The food materials are supplied to the feeding container or hopper in a finely divided state as required, and are fed by gravity into the casing 3. The disc 11, rotating at high speed, tends to throw the food materials outward to the periphery of the casing with great force. The materials, however, are impeded by baffles 28 formed integral with the casing so that the food materials travel at a considerably less speed than the peripheral speed of the disc 11. The periphery of the disc 11 runs closely adjacent to the inner surface of the casing 2 and the periphery of the disc is provided with a multiplicity of shallow notches 29. Some of the food material enters the notches 29 and some of it enters the space between the extreme periphery of the disc and the casing. Because of the substantial difference in speed of the food particles and the periphery of the disc, the teeth fly past the food particles and clip off tiny portions thereof as the particles attempt to enter the notches. Material which enters the notches travels substantially at the speed of the disc and is thrown outward, displacing the slower moving material which is retarded by the frictional drag of the casing and causing the latter material to enter the notches. This material, in entering the notches, is clipped into minute particles. The space between the periphery of the disc and the casing stands filled with food materials at all times because of the centrifugal force applied to the food particles, so that no steam passes the disc and none escapes through the nipple 6 and the conduit 7. It should here be noted that the steam used is preferably only of such temperature and pressure as will be sufficient to accomplish the desired biological inactivating effects. When the food material has passed the disc its tendency is to continue to rotate with the disc at the periphery thereof. Baffles 30, integral with casing section 4, interrupt the travel of the material and cause an accumulation of the material to occur in the bottom of the casing so that the material is continuously discharged through the outlet nipple 26 of the conduit 27.

It is highly important that the food materials escape any and all metallic contamination in passing through the disintegrator. It is accordingly a feature that all food materials passing through the disintegrator are exposed only to non-corroding, non-oxidizing surfaces. This may be accomplished, for example, by constructing the parts of metal and chromium plating them or by making the parts of non-corroding, non-oxidizing metal.

The treatment of the minutely divided or comminuted material with steam, while still subject to the agitating effect of the disintegrator, is especially favorable to the effect of thorough pasteurization and sterilization.

The treatment of comminuted materials with dry steam, while still subject to the agitating effect and disintegration, in order to obtain a higher temperature in the machine than at the outlet is decidedly favorable to thorough sterilization and to the maximum liberation of air and oxygen.

The materials are delivered from the disintegrator in a finely divided and homogeneous state, and in some instances appear in the form of emulsions. Specimens of fruit material run through the disintegrator when packed in sterile sealed containers appear from tests conducted to be sterilized and keep indefinitely.

The following examples are given to illustrate the process as applied to various materials and the nature of the results produced.

The apparatus has been employed for the making of oyster-tomato puree and oyster-puree. In the former case, whole oysters ground through a non-corrosive food chopper are mixed with the desired proportion of tomato puree, salt, etc., and fed through the disintegrator. The product comes out in the form of a viscous, creamy, homogeneous puree at a temperature of about 200° F. The material is packed and sealed in glass containers and the containers thus packed are sterilized at a temperature of 212° F., for twenty-five to thirty minutes.

After sterilization and rapid cooling to 80° F. the product shows a decided vacuum of 16 to 20 inches. The contents are free from any "cooked" taste or odor, and shows no discoloration or visible signs of oxidation. This product when added to milk, heating and seasoning, produced a delicious puree, aromatic of oyster, with none of the characteristic "flat taste" of cooked oyster. Specimens of this product not further sterilized after packing, indicate no signs of spoilage at end of 10 days incubation at 98° F., indicating the progressive destruction of germs and enzymes with the minimum of heat alteration of food material in the presence of air.

In making oyster puree the whole oyster is ground through a non-corrosive food chopper, mixed with salt and passed through the disintegrator under steam pressure of, say, twenty pounds per square inch. The temperature rise is from 60° F. to 190° F., that is a rise of 130° F. The product comes out a creamy, very viscous, light green color with considerable foaming in the receiving receptacle. This foaming subsides as soon as the product is poured into containers.

The product is then sterilized for 30 minutes, and rapidly cooled to 80° F. The product shows a vacuum of 20 inches. The contents are free from "cooked" or other abnormal odors or taste, and shows no discoloration or signs of oxidation. This product when added to hot milk with the addition of spices produces an unusually delicious oyster puree.

The disintegrator may also be used in the manufacture of asparagus pulp or puree.

The asparagus is washed thoroughly and passed through a non-corrosive food chopper. Twenty per cent of water and a little salt are added and the whole is passed through the disintegrator using a steam pressure of twenty pounds per square inch.

The product comes out a light green color, well disintegrated, homogeneous, and quite viscous. The temperature is raised from, say 70° F. to 165° F. and the volume is increased approximately ten per cent in the course of passage through the disintegrator.

If passed through a second time with great rapidity the temperature is increased to 205° F. producing a product which is more finely divided and slightly less viscous.

The product is packed in say, eight ounce glass jars and sterilized in steam at 200° F. for thirty five minutes. There is no separation or spoilage after cooling and subsequent storage. The product is pronounced in its natural taste and is made into a soup by diluting one part of the product to four parts of milk, water, or beef or chicken broth, seasoning and heating. It is a valuable adjunct for a vegetable soup in about the same proportions.

The apparatus and process have been advantageously used in the making of tomato juice. The tomatoes can either be given a hot break prior to extraction or extracted cold in any machine which prevents incorporation of air. Alternatively, the whole tomatoes can be passed through a regular food chopper in order to make the particles small enough to pass into the disintegrator.

The tomato material is then passed through the disintegrator under, say, twenty pound's steam pressure, packed and sealed. Jars not further heated do not show spoilage on incubation at 98° F.

The taste is characterized by its close resemblance to the taste of fresh, ripe, uncooked tomatoes.

The disintegrator has also been applied to the manufacture of fruit and berry pulp and juices.

In the case of cranberry pulp the berries are pulped in a commercial extractor using a .040 screen, then diluted with fifty per cent of water. A suitable quantity of sugar is added and the mixture passed through the disintegrator. A wholesome juice or cocktail containing all of the flavor of the berries is produced, and this remains unchanged after weeks of storage. No additional treatment is necessary in order to preserve the whole berry pulp after packing. The "bloom" and taste of the berries apparently remains the same as in the raw fruit.

Cranberry pulp without dilution passed through the disintegrator produces a decidedly fine paste capable of further dilution, as if using raw whole berries.

A raspberry paste may be made by pulping raspberries in a commercial extractor using a .040 screen, then passing the pulped material through the disintegrator under twenty pounds per square inch of steam pressure. This produces a product having a definitely raspberry color and taste, the product being viscous and aromatic. Sterilizing at 212° F. provides ample heat for packing, and specimens of the material, not further sterilized after leaving the disintegrator, have been found to keep indefinitely.

In the treatment of bananas, the bananas are cut up in any preferred manner and are then passed into the disintegrator under twenty pounds per square inch steam pressure. The product comes out a plastic mass, aromatic of banana. The temperature rise of the material in passing through the disintegrator is about 125° F.

In Figure 3 disclosure is made of another form of apparatus which may be used in carrying out the process of this invention.

This apparatus comprises a base 31. A standard 32 is supported by the base and supports in turn a casing 33. A bowl or hopper 34 is mounted upon the casing 33 and serves as a receptacle for delivering to the casing 33 by gravity material which is to be disintegrated and sterilized.

A tapering screw 35 extends through the casing 33. The screw is rotated by a shaft 36 which is driven from any suitable source of power. A frusto-conical screen 37 is placed around the tapered portion of the screw 35. A flanged, threaded ring 38 is placed over a circumferential flange 39 at the larger end of the screen and is threaded onto the casing 33 to clamp the screen in place.

The screw 35 at the smaller end thereof is cylindrical, and the groove of the screw which becomes more and more shallow as it approaches the smaller end of the screw terminates in a straight, shallow, longitudinally extending portion that extends to the end of the screw. A frusto-conical casing 40 surrounds the screen and is provided with a slot 41 at the lower side thereof through which the comminuted material may fall into a receiving vessel 42. The screen 37 terminates in a cylindrical portion which hugs the cylindrical portion of the screw 35 snugly and prevents passage of seeds, hulls and fibers to the chamber of the casing 40. The seeds, hulls and fibers are caused to travel along the longitudinally extending portion of the screw groove and to be discharged outside of the chamber formed in the casing 40. The chamber referred to is bounded by a partition wall 43. The casing 40, however, projects beyond the partition 43 and serves to confine refuse materials such as seeds, hulls, skins and fibers which are discharged by the screw.

A standard 44 is mounted on the base 31 and supports a steam pipe 45. The steam pipe 45 has a reduced end portion which forms a bearing for a complementary pipe section 46. The pipe section 46 is fixed to the screw 35 and turns with the screw. The interfitting ends of the pipes 45 and 46 are surrounded by a packing material 47. A bushing 48 is threaded into the standard 44 and holds the packing material 47 compressed. The bushing 48 forms a bearing for the pipe 46.

The pipe 46 communicates with a passage 49 which extends longitudinally within the screw 35. Numerous radial passages 50 extend outward from the axial passage 49 for discharging steam from the periphery of the screw. The steam is thus injected into the food material and is caused to raise the temperature thereof at the time when the material is subjected to the greatest pressure. After the material has been pressed through the screen 37 the pressure on the material is diminished so that there is a substantial liberation of air and oxygen.

As in the case of the apparatus disclosed in Figures 1 and 2 all of the parts of the apparatus of Figure 3 which come in contact with the food material are constructed of material which is non-oxidizing and non-corroding and which does not impair the taste and flavor of the food.

While steam has been illustratively described as the sterilizing or pasteurizing medium, it will be appreciated that gas, vapor or atomized liquids possessing germicidal and/or anti-enzymatic properties may be used in lieu of steam in carrying out the method of this invention. The term "steam" as used in the claims is intended, therefore, to comprehend these equivalents.

I have described what I believe to be the best embodiment of my invention. I do not wish, however, to be confined to the embodiment shown, but what I desire to cover by Letters Patent is set forth in the appended claims.

I claim:

1. The method of preparing comminuted food, drug, cosmetic or other compositions of matter liable to deterioration, which comprises continuously feeding the material to be treated into a chamber, causing said material to seal said chamber against the escape of fluid at the point of entry of the material, mechanically agitating the comminuted material in said chamber to produce a finely divided mass, causing said material while being comminuted in said chamber to pass through a restricted way, the degree of subdivision of the material being greatest at said restricted way, forcing steam under pressure into said chamber and causing said steam in the chamber to flow into intimate contact with, the comminuted material at the restricted way whereby enzymes and micro-organism in said material are destroyed, and continuously discharging the treated material from the chamber.

2. The process as defined in claim 1, in which the material while passing through said chamber is whirled at high velocity and caused to pass through said restricted way while in such whirling motion and in which the steam is caused to flow to said restricted way in a direction counter to that of the flow of the material.

AXEL LEONARD SODERGREEN.